United States Patent
Chueh et al.

(10) Patent No.: US 11,551,155 B2
(45) Date of Patent: Jan. 10, 2023

(54) ENSEMBLE LEARNING PREDICTING METHOD AND SYSTEM

(71) Applicant: INDUSTRIAL TECHNOLOGY RESEARCH INSTITUTE, Hsinchu (TW)

(72) Inventors: Chuang-Hua Chueh, Taipei (TW); Jia-Min Ren, Hsinchu (TW); Po-Yu Huang, Tainan (TW); Yu-Hsiuan Chang, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1030 days.

(21) Appl. No.: 16/231,732

(22) Filed: Dec. 24, 2018

(65) Prior Publication Data
US 2020/0151610 A1    May 14, 2020

(30) Foreign Application Priority Data
Nov. 9, 2018 (TW) .................. 107139955

(51) Int. Cl.
*G06N 20/20* (2019.01)
*G06K 9/62* (2022.01)

(52) U.S. Cl.
CPC .......... *G06N 20/20* (2019.01); *G06K 9/6228* (2013.01); *G06K 9/6256* (2013.01); *G06K 9/6262* (2013.01)

(58) Field of Classification Search
CPC .... G06N 20/20; G06K 9/6228; G06K 9/6256; G06K 9/6262; G06K 9/6292; G06Q 10/04
See application file for complete search history.

(56) References Cited

U.S. PATENT DOCUMENTS 7,529,403 B2    5/2009   Ivanov
8,868,472 B1    10/2014  Lin et al.
(Continued)

FOREIGN PATENT DOCUMENTS

CN    103439472 A    12/2013
CN    103631753 A    3/2014
(Continued)

OTHER PUBLICATIONS

Huang et al., "Machine learning: Bagging, Boosting and AdaBoost of Ensemble Learning," Medium, Jun. 20, 2018, pp. 1-10.
(Continued)

*Primary Examiner* — Aaron W Carter
(74) *Attorney, Agent, or Firm* — Birch, Stewart, Kolasch & Birch, LLP

(57) ABSTRACT

An ensemble learning prediction method includes: establishing a plurality of base predictors based on a plurality of training data; initializing a plurality of sample weights of a plurality of sample data and initializing a processing set; in each iteration round, based on the sample data and the sample weights, establishing a plurality of predictor weighting functions of the predictors in the processing set and predicting each of the sample data by each of the predictors in the processing set for identifying a prediction result; evaluating the predictor weighting functions, and selecting a respective target predictor weighting function from the predictor weighting functions established in each iteration round and selecting a target predictor from the predictors in the processing set to update the processing set and to update the sample weights of the sample data.

12 Claims, 3 Drawing Sheets

(56) References Cited

U.S. PATENT DOCUMENTS

| | | | |
|---|---|---|---|
| 9,141,622 B1* | 9/2015 | Moore | G06K 9/6277 |
| 9,672,355 B2 | 6/2017 | Titonis et al. | |
| 9,697,469 B2 | 7/2017 | McMahon et al. | |
| 9,758,829 B2 | 9/2017 | Wang et al. | |
| 9,916,538 B2 | 3/2018 | Zadeh et al. | |
| 10,769,550 B2* | 9/2020 | Hsieh | G06N 20/20 |
| 2007/0133857 A1* | 6/2007 | Wang | G06K 9/6256 |
| | | | 382/133 |
| 2008/0027887 A1* | 1/2008 | Barbu | G06N 20/20 |
| | | | 706/25 |
| 2010/0042561 A1* | 2/2010 | Abe | G06N 20/20 |
| | | | 706/12 |
| 2012/0089545 A1* | 4/2012 | Mei | G06K 9/6257 |
| | | | 706/20 |
| 2014/0029840 A1* | 1/2014 | Ebara | G06K 9/6256 |
| | | | 382/159 |
| 2015/0313529 A1 | 11/2015 | Nevo et al. | |
| 2016/0170996 A1 | 6/2016 | Frank et al. | |
| 2016/0253466 A1 | 9/2016 | Agaian et al. | |
| 2016/0253597 A1* | 9/2016 | Bhatt | G06N 20/00 |
| | | | 706/12 |
| 2017/0032276 A1* | 2/2017 | Sukhanov | G06N 20/00 |
| 2017/0108502 A1 | 4/2017 | Mulvihill et al. | |
| 2017/0233822 A1 | 8/2017 | Too et al. | |
| 2017/0308802 A1 | 10/2017 | Ramsøy et al. | |
| 2017/0356055 A1 | 12/2017 | Barnett-Itzhaki et al. | |
| 2018/0010198 A1 | 1/2018 | Anjamshoaa et al. | |
| 2018/0119222 A1 | 5/2018 | Zou et al. | |
| 2018/0137427 A1* | 5/2018 | Hsieh | G06F 16/285 |
| 2018/0210944 A1* | 7/2018 | Sukhanov | G06K 9/6288 |
| 2020/0151610 A1* | 5/2020 | Chueh | G06K 9/6292 |
| 2021/0097446 A1* | 4/2021 | Kim | G06N 20/20 |

FOREIGN PATENT DOCUMENTS

| | | |
|---|---|---|
| CN | 105678418 A | 6/2016 |
| CN | 105955214 A | 9/2016 |
| CN | 106845510 A | 6/2017 |
| CN | 107076746 A | 8/2017 |
| CN | 107290305 A | 10/2017 |
| EP | 3176270 A1 | 6/2017 |
| JP | 6218141 B2 | 10/2017 |
| TW | I543102 B | 7/2016 |
| TW | 201820229 A | 6/2018 |
| WO | WO 2016/141330 A1 | 9/2016 |
| WO | WO 2017/138007 A1 | 8/2017 |
| WO | WO 2017/147552 A9 | 8/2017 |
| WO | WO 2018/036503 A1 | 3/2018 |
| WO | WO 2018/076134 A1 | 5/2018 |
| WO | WO 2018/083608 A1 | 5/2018 |

OTHER PUBLICATIONS

Taiwanese Office Action and Search Report for Taiwanese Application No. 107139955, dated Jun. 24, 2021.

Cruz et al. "META-DES: Adynamic ensemble selection framework using meta-learning", Pattern Recognition, 48, (2015), p. 1925-1935.

Kittler et al. "On Combining Classifiers", IEEE Transactions on Pattern Analysis and Machine Intelligence, vol. 20, No. 3, Mar. 1998, p. 226-239.

Ko et al. "From dynamic classifier selection to dynamic ensemble selection", Pattern Recognition, 41, (2008), p. 1718-1731.

* cited by examiner

ENSEMBLE LEARNING PREDICTING METHOD AND SYSTEM

CROSS-REFERENCE TO RELATED ART

This application claims the benefit of Taiwan application Ser. No. 107139955, filed Nov. 9, 2018, the disclosure of which is incorporated by reference herein in its entirety.

TECHNICAL FIELD

The disclosure relates in general to an ensemble learning predicting method and system thereof.

BACKGROUND

In manufacturing industry or other industries, predicting future events by analyzing history data is important. In intelligent manufacturing factory, the machine will record a lot of manufacturing parameters, such as temperature, press, gas flow etc. The manufacturing parameters may be used as sample data to predict manufacturing quality or whether the machine is failed or not.

Ensemble learning is one of supervised learning in machine learning. In ensemble learning, the prediction result is obtained by dynamically selecting the highest-confidence predictor (or hypothesis) among a plurality of predictors, wherein each predictor is assigned by respective weighting.

FIG. 1 (prior art) shows an example of an ensemble learning system. As shown in FIG. 1, the sample data x is input into each of the base predictors $h_1(x)$, $h_2(x)$ and $h_3(x)$. Weighting of the base predictors $h_1(x)$, $h_2(x)$ and $h_3(x)$ are $w_1$, $w_2$ and $w_3$, respectively. If the weighting is fixed (i.e. the weighting does not vary according to the sample data x), then the prediction result y is expressed as: $y=w_1h_1(x)+w_2h_2(x)+w_3h_3(x)$. If the weighting is dynamic (i.e. the weighting is expressed as: $w_i=g_i(x)$, and $w_i$ varies according to the sample data x), then the prediction result y is expressed as: $y=g_1(x)h_1(x)+g_2(x)h_2(x)+g_3(x)h_3(x)$. In ensemble learning, the prediction result is better if the weighting is dynamic other than fixed. However, if the sample has complicated distribution, the confidence prediction is not easily accuracy and thus it is difficult to effectively train the dynamic weighting.

Thus, even if the sample space is complicated, effective training of the dynamic weighting is one important consideration in designing the ensemble learning test system.

SUMMARY

According to one embodiment, provided is an ensemble learning prediction method for an electronic device, the method including: (a) establishing a plurality of base predictors based on a plurality of training data from a signal source; (b) initializing a plurality of sample weights of a plurality of sample data and initializing a processing set; (c) in a first iteration round, based on the plurality of sample data and the plurality of sample weights, establishing a plurality of predictor weighting functions of the predictors in the processing set and predicting each of the plurality of sample data by each of the predictors in the processing set for identifying a prediction result; (d) evaluating the plurality of predictor weighting functions, and selecting a target predictor weighting function from the plurality of predictor weighting functions established in the first iteration round and selecting a target predictor from the plurality of predictors in the processing set based on an evaluation result to update the processing set and to update the plurality of sample weights of the plurality of sample data; and (e) performing a next iteration round to repeat the above steps (c) and (d) until all iteration rounds are performed to select a plurality of target predictor weighting functions and a plurality of target predictors to combine into an ensemble predictor, wherein the ensemble predictor includes the plurality of target predictor weighting functions and the plurality of target predictors; and a prediction result of the ensemble predictor is shown in a display.

According to another embodiment, provided is an ensemble learning prediction system including: a base predictor training model for establishing a plurality of base predictors based on a plurality of training data from a signal source; a predictor weighting function training module, for initializing a plurality of sample weights of a plurality of sample data and initializing a processing set, in a first iteration round, based on the plurality of sample data and the plurality of sample weights, establishing a plurality of predictor weighting functions of the predictors in the processing set and predicting each of the plurality of sample data by each of the predictors in the processing set for identifying a prediction result; an evaluation module for evaluating the plurality of predictor weighting functions, and selecting a target predictor weighting function from the plurality of predictor weighting functions established in the first iteration round and selecting a target predictor from the plurality of predictors in the processing set based on an evaluation result; and a sample weight adjustment module for updating the processing set and for updating the plurality of sample weights of the plurality of sample data; wherein a next iteration round is performed to repeat the above operations until all iteration rounds are performed to select a plurality of target predictor weighting functions and a plurality of target predictors to combine into an ensemble predictor, wherein the ensemble predictor includes the plurality of target predictor weighting functions and the plurality of target predictors; and a prediction result of the ensemble predictor is shown in a display.

Figure 1:
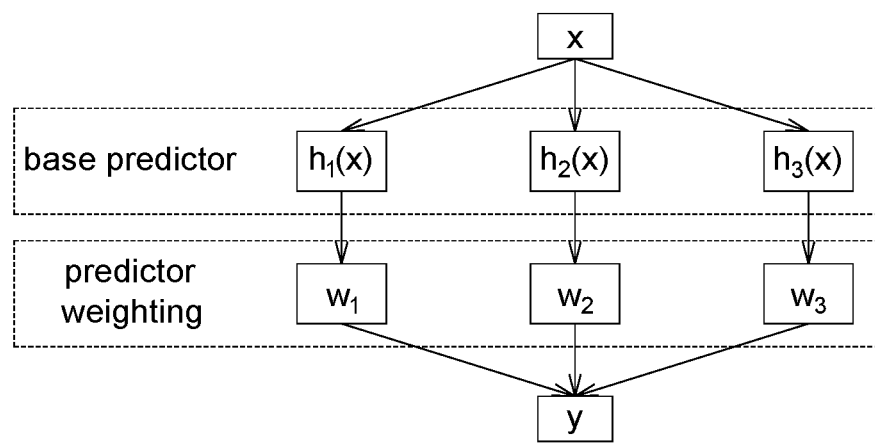
FIG. 1 (prior art) shows an example of an ensemble learning system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
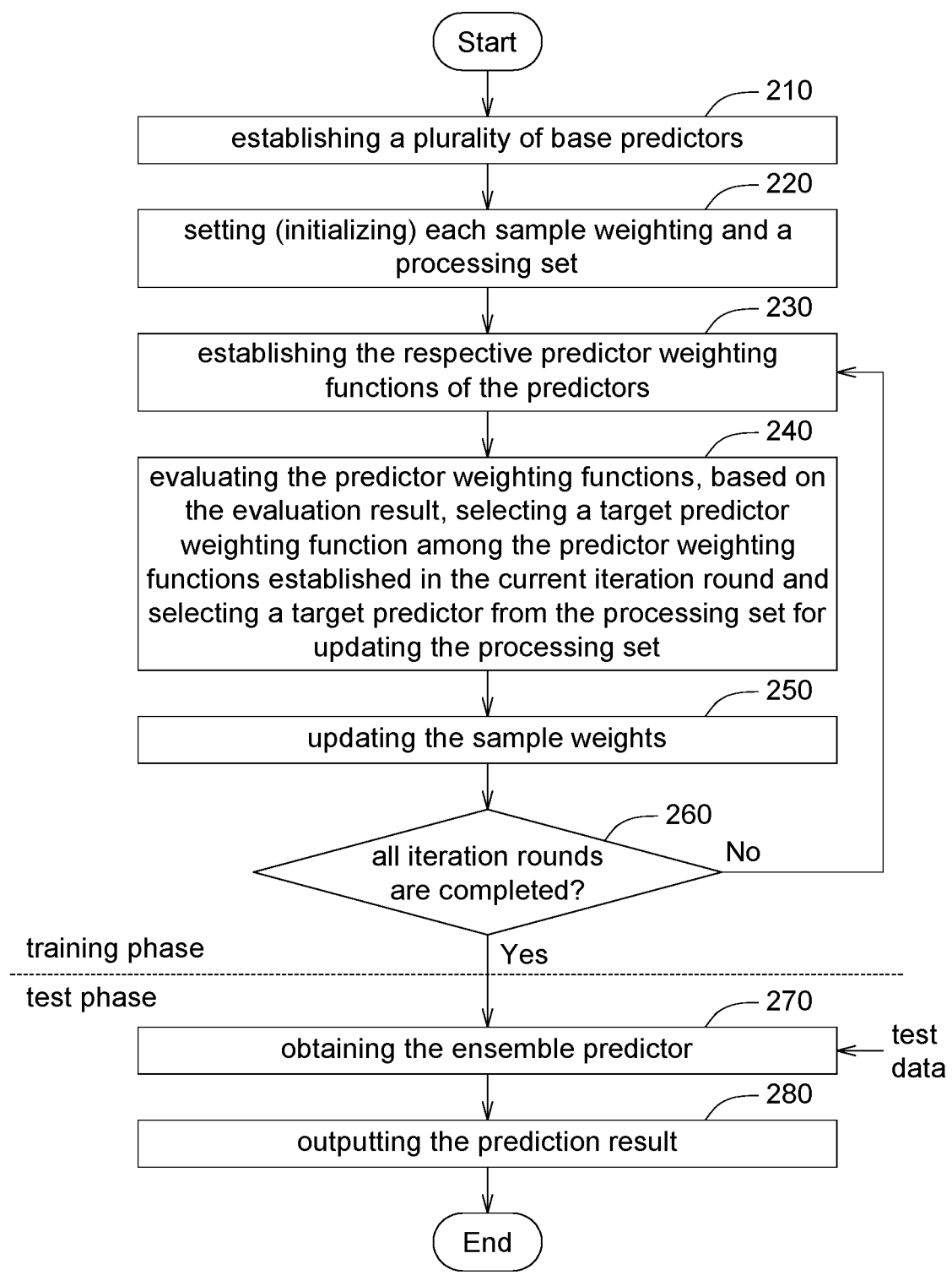
FIG. 2 shows a flow chart of an ensemble learning predicting method according to one embodiment of the application.

FIG. 2 shows a flow chart of an ensemble learning predicting method according to one embodiment of the application, which is applicable in an electronic device having a processing circuit. As shown in FIG. 2, in step 210 (the training phase), the training data $D_{train}$ is used in establishing base predictors $h_1, h_2, \ldots h_N$ (N being a positive integer). Each of the base predictors $h_i$ (i=1~N) may come from different algorithms, or different hyperparameter or different samples. The application is not limited by this.

In step 220 (the training phase), each sample weighting of each sample in the validation data $D_{valid}$ is set (initialized) and a processing set H is set (initialized). Each sample weighting $k_j^{(t=1)}$ of each sample $x_j$ (j=1~n, n meaning the sample number of the validation data) in the validation data $D_{valid}$ is initialized (t=1, t meaning the iteration round number). For example, each sample weighting $k_j^{(t=1)}$ of each sample $x_j$ (j=1~n) is initialized as 1 (i.e. $k_j^{(t=1)}=1$). The initialized processing set H is expressed as: H={$h_1, h_2, \ldots h_N$}. The predictors included in the processing set H are the unselected predictors. As for the principle of selecting the predictors is described as follows. In an embodiment of the application, the training data $D_{train}$ and the validation data $D_{valid}$ are both the sample data. For example but not limited by, there are 1000 sample data, 800 of the 1000 sample data are as the training data $D_{train}$ while the remaining 200 sample data of the 1000 sample data are as the validation data $D_{valid}$. Of course, the application is not limited by this.

In step 230 (the training phase), in the first iteration round, the respective predictor weighting functions of the predictors in the processing set H is established based on all sample data and each sample weighting of all sample data in the validation data $D_{valid}$.

After the respective predictor weighting functions of the predictors are established, the predictors $h_i$ in the processing set H predict each sample $x_j$ in the validation data $D_{valid}$, respectively. Whether the prediction results are true or false is determined and the prediction results are recorded.

For example, the predictor $h_1$ predicts each sample $x_j$ in the validation data $D_{valid}$. Whether the prediction results predicted by the predictor $h_1$ are true or false is determined and the prediction results predicted by the predictor $h_1$ are recorded. Then, the predictor $h_2$ predicts each sample $x_j$ in the validation data $D_{valid}$. Whether the prediction results predicted by the predictor $h_2$ are true or false is determined and the prediction results predicted by the predictor $h_2$ are recorded. The steps are repeated until the predictor $h_N$ of the processing set H predicts each sample $x_j$ in the validation data $D_{valid}$. Whether the prediction results predicted by the predictor $h_N$ are true or false is determined and the prediction results predicted by the predictor $h_N$ are recorded.

For example, in the first iteration round (t=1), the prediction results from the predictor $h_1$ are as follows:

|  | the prediction results from the predictor $h_1$ are true | the prediction results from the predictor $h_1$ are false |
| --- | --- | --- |
| $f_1^{(1)}$ having high output value | R1 | R3 |
| $f_1^{(1)}$ having low output value | R2 | R4 |

Whether $f_1^{(1)}$ is high or low is determined based on whether $f_1^{(1)}$ is higher than a predetermined threshold or not (in an embodiment, $f_1^{(1)}$ varies according to the sample data x). The set R1 means the set of the sample data which are correctly predicted by the predictor $h_1$ when $f_1^{(1)}$ has a high output value. The set R2 means the set of the sample data which are correctly predicted by the predictor $h_1$ when $f_1^{(1)}$ has a low output value. The set R3 means the set of the sample data which are not correctly predicted by the predictor $h_1$ when $f_1^{(1)}$ has a high output value. The set R4 means the set of the sample data which are not correctly predicted by the predictor $h_1$ when $f_1^{(1)}$ has a low output value. In an embodiment of the application, $f_i^{(t)}$ means the predicting weighting function of the predictor $h_i$ established in the t-th iteration round.

In the step 240 (the training phase), the established predictor weighting functions are evaluated. Based on the evaluation result, a target predictor weighting function is selected among the predictor weighting functions established in the current iteration round, a target predictor is selected among the processing set H and the processing set H is updated (for example, the selected target predictor is removed from the processing set H).

Details of the step 240 are as follows. In each iteration round, when each predictor weighting function of each predictor is evaluated, the confidence score $s_i$ is evaluated as follows. Of course, the application is not limited by this and other possible embodiment of the application may use other different confidence formula which is still within the scope of the application.

$$s_i = \frac{\sum_{x_j \in R_1 \cup R_4} k_j^{(t)}}{\sum_j k_j^{(t)}}$$

$k_j^{(t)}$ means the sample weighting of the sample data $x_j$ which is used in training the predictor weighting function in t-th iteration round. Among all predictor weighting functions, the predictor weighting function having highest confidence score is selected. If the weighting function $f_i$ has the highest confidence score, in the t-th iteration round, it is set $h_{(t)}=h_i$ and $g_{(t)}=f_i^{(t)}$ and the predictor $h_i$ is removed from the processing set H. For example, in the current iteration round, the weighting function $f_2$ has the highest confidence score, then the predictor $h_2$ and the weighting function $f_2$ are selected and the predictor $h_2$ is removed from the processing set H. $h_{(t)}$ and $g_{(t)}$ mean the target predictor and the target predictor weighting function selected in the t-th iteration round, respectively. In an embodiment of the application, the confidence score of the predictor weighting function means whether the prediction result of the predictor is consistent with the output value of the predictor weighting function or not. Higher the confidence score, more consistence between the prediction result of the predictor and the output value of the predictor weighting function. On the contrary, lower the confidence score, less consistence between the prediction result of the predictor and the output value of the predictor weighting function.

In step 250 (the training phase), each sample weight of each sample of the validation data $D_{valid}$ is updated and the details will be described later. If all iteration rounds are not completed yet (step 260), then the flow returns to the step 230 for the next iteration round. On the contrary, if all iteration rounds are completed, then all target predictor weighting functions are established and trained and thus the training phase is over. The ensemble predictor is obtained (step 270).

Based on the established base predictors and the respective predictor weighting functions, the ensemble predictor is obtained. In the test phase, the test data x is input into the ensemble predictor for outputting the prediction result y (step 280). In an embodiment of the application, the prediction result may be shown on a display (not shown). Further, in an embodiment of the application, the test data (used in the test phase), the training data $D_{train}$ (used in the training phase) and the validation data $D_{valid}$ (used in the training phase) are generated by the same signal source, the signal source being for example but not limited by, a sensor in an intelligent manufacturing factory for sensing manufacturing parameters (the temperature, the humidity and the pressure etc.).

In the t-th iteration round, the sample weighting $k_j^{(t+1)}$ of each sample $x_j$ is updated as follows, wherein c>1 and $\alpha_3 > \alpha_4 > \alpha_2 > \alpha_1$. The updated sample weighting may be used in training the predictor weighting functions in the (t+1)-th iteration round.

|  | $x_j$ is correctly predicted by $h_{(t)}$ | $x_j$ is not correctly predicted by $h_{(t)}$ |
|---|---|---|
| $g_{(t)}(x_j)$ is low | $k_j^{(t+1)} = k_j^{(t)} c^{\alpha 1}$ | $k_j^{(t+1)} = k_j^{(t)} c^{\alpha 3}$ |
| $g_{(t)}(x_j)$ is high | $k_j^{(t+1)} = k_j^{(t)} c^{\alpha 2}$ | $k_j^{(t+1)} = k_j^{(t)} c^{\alpha 4}$ |

That is, in updating the sample weighting of each sample $x_j$, if in the t-th iteration round, the sample $x_j$ is correctly predicted by the (selected) predictor $h_{(t)}$ and the predictor weighting function $g_{(t)}(x_j)$ of the (selected) predictor $h_{(t)}$ is high, the sample weighting of each sample $x_j$ is updated as: $k_j^{(t+1)}=k_j^{(t)}c^{\alpha 1}$ (i.e. the sample weighting is lowered or decreased). If in the t-th iteration round, the sample $x_j$ is correctly predicted by the (selected) predictor $h_{(t)}$ and the predictor weighting function $g_{(t)}(x_j)$ of the (selected) predictor $h_{(t)}$ is low, the sample weighting of each sample $x_j$ is updated as: $k_j^{(t+1)}=k_j^{(t)}c^{\alpha 2}$ (i.e. the sample weighting is lowered or decreased). If in the t-th iteration round, the sample $x_j$ is not correctly predicted by the (selected) predictor $h_{(t)}$ and the predictor weighting function $g_{(t)}(x_j)$ of the (selected) predictor $h_{(t)}$ is high, the sample weighting of each sample $x_j$ is updated as: $k_j^{(t+1)}=k_j^{(t)}c^{\alpha 3}$ (i.e. the sample weighting is increased). If in the t-th iteration round, the sample $x_j$ is not correctly predicted by the (selected) predictor $h_{(t)}$ and the predictor weighting function $g_{(t)}(x_j)$ of the (selected) predictor $h_{(t)}$ is low, the sample weighting of each sample $x_j$ is updated as: $k_j^{(t+1)}=k_j^{(t)}c^{\alpha 4}$ (i.e. the sample weighting is increased).

In an embodiment of the application, the sample which is not correctly predicted by the (selected) predictor $h_{(t)}$ will have a higher sample weighting in the next iteration round; and on the contrary, the sample which is correctly predicted by the (selected) predictor $h_{(t)}$ will have a lower sample weighting in the next iteration round.

Thus, in an embodiment of the application, updating the sample weighting of the sample is based on evaluating the consistence between the predictor weighting functions and the prediction results of the selected predictor. The sample weighting of the sample is decreased when a high consistence between the predictor weighting functions and the prediction results of the selected predictor. The sample weighting of the sample is increased when a low consistence between the predictor weighting functions and the prediction results of the selected predictor. Further, in an embodiment of the application, updating (adjusting) the sample weighting is based on "whether the prediction results are correct or not" and "whether the prediction results of the predictor and the output value of the predictor weighting function are consistent or not".

Further, when the predicting results of the selected predictor are correct and the selected predictor is assigned by a high predictor weighting function, it is defined as the consistence is high. When the predicting results of the selected predictor are wrong and the selected predictor is assigned by a low predictor weighting function, it is defined as the consistence is high. When the predicting results of the selected predictor is correct and the selected predictor is assigned by a low predictor weighting function, it is defined as the consistence is low. When the predicting results of the selected predictor is wrong and the selected predictor is assigned by a high predictor weighting function, it is defined as the consistence is low.

An example is used in describing an embodiment of the application. For simplicity, the situations in the example are: three iteration rounds (t=3), the validation data $D_{valid}$ having 5 sample data x1-x5, c=1.5 and $(\alpha_1, \alpha_2, \alpha_3, \alpha_4)=(-1, 0, 2, 1)$. The processing set H is initialized as $H=\{h_1, h_2, h_3\}$. After initialization, the sample weights of the sample x1-x5 are as: $(k_1^{(1)}, k_2^{(1)}, k_3^{(1)}, k_4^{(1)}, k_5^{(1)})=(1, 1, 1, 1, 1)$.

In the first iteration round, the predictor weighting functions $f_1^{(1)}, f_2^{(1)}, f_3^{(1)}$ of the predictors $h_1, h_2, h_3$ are established based on the sample data x1-x5 and the sample weighting $k_1^{(1)}, k_2^{(1)}, k_3^{(1)}, k_4^{(1)}, k_5^{(1)}$ of the sample data x1-x5. Details of establishing the weighting functions are not specified here.

The respective confidence scores of each predictor weighting function $f_1^{(1)}, f_2^{(1)}, f_3^{(1)}$ are calculated in the first iteration round. The prediction result of the predictor $h_1$ is for example as follows:

|  | Samples which are correctly predicted by $h_1$ | Samples which are not correctly predicted by $h_1$ |
|---|---|---|
| $f_1^{(1)}$ is high | x1, x2 | x5 |
| $f_1^{(1)}$ is low | x4 | x3 |

The confidence score s1 of the predictor weighting function $f_1^{(1)}$ is as follows:

$$s_1 = \frac{\sum_{x_j \in R_1 \cup R_4} k_j^{(1)}}{\sum_j k_j^{(1)}} = \frac{k_2^{(1)} + k_2^{(1)} + k_3^{(1)}}{k_1^{(1)} + k_2^{(1)} + k_3^{(1)} + k_4^{(1)} + k_5^{(1)}} = \frac{1+1+1}{1+1+1+1+1}$$

The confidence scores of each of the predictor weighting functions $f_1^{(1)}, f_2^{(1)}, f_3^{(1)}$ are calculated, If the predictor weighting function $f_2^{(1)}$ has the highest confidence score, it means that in the first iteration round, the predictor weighting function $f_2^{(1)}$ is best. In the first iteration round, the predictor $h_2$ is selected as the target predictor and the predictor weighting function $f_2^{(1)}$ is selected as the target predictor weighting function, that is, $h_{(1)}=h_2$ and $g_{(1)}=f_2^{(1)}$ ($h_{(1)}$ and $g_{(1)}$ are the target predictor and the target predictor weighting function selected in the first iteration round) and the processing set H is updated as: $H=\{h_1, h_3\}$ (i.e. $h_2$ is removed from H). Based on the results in the first iteration round, the sample weighting of the sample data x1-x5 are updated as: $(k_1^{(2)}, k_2^{(2)}, k_3^{(2)}, k_4^{(2)}, k_5^{(2)}) = (k_1^{(1)}*1.5^{-1}, k_2^{(1)}*1.5^{-1}, k_3^{(1)}*1.5^{1}, k_4^{(1)}*1.5^{0}, k_5^{(1)}*1.5^{2})$, wherein $k_1^{(2)}$, $k_2^{(2)}, k_3^{(2)}, k_4^{(2)}, k_5^{(2)}$ are used in the second iteration round.

In the second iteration round, the predictor weighting functions $f_1^{(2)}, f_3^{(2)}$ of the predictors $h_1, h_3$ are established based on the sample data x1-x5 and the sample weighting $k_1^{(2)}, k_2^{(2)}, k_3^{(2)}, k_4^{(2)}, k_5^{(2)}$ of the sample data x1-x5.

Similarly, the confidence scores $s_1$ and $s_3$ of the predictor weighting functions $f_1^{(2)}, f_3^{(2)}$ of the predictors $h_1, h_3$ in the processing set H are calculated in the second iteration round. The prediction result of the predictor $h_3$ is for example as follows:

|  | Samples which are correctly predicted by $h_3$ | Samples which are not correctly predicted by $h_3$ |
|---|---|---|
| $f_3^{(2)}$ is high | x4, x5 | x3 |
| $f_3^{(2)}$ is low | x1 | x2 |

Thus, the confidence score $s_3$ of the weighting function $f_3^{(2)}$ is as follow:

$$s_3 = \frac{\sum_{x_j \in R_1 \cup R_4} k_j^{(2)}}{\sum_j k_j^{(2)}} = \frac{k_2^{(2)} + k_4^{(2)} + k_5^{(2)}}{k_1^{(2)} + k_2^{(2)} + k_3^{(2)} + k_4^{(2)} + k_5^{(2)}}$$

The confidence scores of the predictor weighting functions $f_1^{(2)}, f_3^{(2)}$ are calculated, If the predictor weighting function $f_3^{(2)}$ has the higher confidence score, it means that in the second iteration round, the predictor weighting function $f_3^{(2)}$ is better. In the second iteration round, the predictor $h_3$ is selected as the target predictor and the predictor weighting function $f_3^{(2)}$ is selected as the target predictor weighting function, that is, $h_{(2)}=h_3$ and $g_{(2)}=f_3^{(2)}$ ($h_{(2)}$ and $g_{(2)}$ are the target predictor and the target predictor weighting function selected in the second iteration round) and the processing set H is updated as: $H=\{h_1\}$ (i.e. $h_3$ is removed from H). Based on the results in the second iteration round, the sample weighting of the sample data x1-x5 are updated as: $(k_1^{(3)}, k_2^{(3)}, k_3^{(3)}, k_4^{(3)}, k_5^{(3)}) = (k_1^{(2)}*1.5^0, k_2^{(2)}*1.5^1, k_3^{(2)}*1.5^2, k_4^{(2)}*1.5^{-1}, k_5^{(2)}*1.5^{-1}) = (k_1^{(1)}*1.5^{-1}*1.5^0, k_2^{(1)}*1.5^{-1}*1.5^1, k_3^{(1)}*1.5^1*1.5^2, k_4^{(1)}*1.5^0*1.5^{-1}, k_5^{(1)}*1.5^2*1.5^{-1})$, wherein $k_1^{(3)}, k_2^{(3)}, k_3^{(3)}, k_4^{(3)}, k_5^{(3)}$ are used in the third iteration round.

In the third iteration round, the predictor weighting function $f_1^{(3)}$ of the predictor $h_1$ is established based on the sample data x1-x5 and the sample weighting $k_1^{(3)}, k_2^{(3)}, k_3^{(3)}, k_4^{(3)}, k_5^{(3)}$ of the sample data x1-x5. Thus, in the third iteration round, the predictor $h_1$ is selected as the target predictor and the predictor weighting function $f_1^{(3)}$ is selected as the target predictor weighting function, that is, $h_{(3)}=h_1$ and $g_{(3)}=f_1^{(3)}$ ($h_{(3)}$ and $g_{(3)}$ are the target predictor and the target predictor weighting function selected in the third iteration round) and the processing set H is updated as: $H=\{\phi\}$ (i.e. $h_1$ is removed from H). By so, the ensemble predictor is established.

In another example, the prediction result y of a test data $x_{test}$ have two possible results: 1 or −1. After $x_{test}$ is introduced into $h_{(i)}(x)$ and $g_{(i)}(x)$:

$(h_{(1)}(x_{test}), h_{(2)}(x_{test}), h_{(3)}(x_{test})) = (1, -1, -1)$ $(g_{(1)}(x_{test}), g_{(2)}(x_{test}), g_{(3)}(x_{test})) = (0.3, 0.7, 0.6)$ The prediction result is obtained by the following two ensemble implementations, which is not to limit the application:

Implementation 1:

The threshold is set as 0.5. Based on a sequence of $g_{(1)}, g_{(2)}, g_{(3)}$, the first weighting function whose output value is higher than the threshold is selected. The weighing function $g_{(1)}(x_{test})$ has an output value of 0.3, lower than the threshold. Then, the weighing function $g_{(2)}(x_{test})$ has an output value of 0.7, higher than the threshold. The weighing function $g_{(2)}(x_{test})$ is selected. Thus, the predictor $h_{(2)}(x_{test})$ which is corresponding to the selected weighing function $g_{(2)}(x_{test})$ has a value of −1, and the ensemble prediction result of the test data $x_{test}$ is −1 (i.e. $y=h_{(2)}(x_{test})=-1$).

Thus, in the implementation 1, the function output value of each of the predictor weighting functions are calculated. The weighting function which is the first one to have an output value higher than the threshold is assigned by a highest weighting and the other weighting functions are assigned by zero weighting.

Implementation 2:

The $g_{(i)}(x)$ are normalized and averaged:

$$\frac{\sum (g_{(i)}*h_{(i)})}{\sum g_{(i)}} =$$

$$\frac{0.3*1}{0.3+0.7+0.6} + \frac{0.7*(-1)}{0.3+0.7+0.6} + \frac{0.6*(-1)}{0.3+0.7+0.6} = -0.625.$$

If the normalized-average result is smaller than 0, then −1 is as the ensemble prediction result of the test data $x_{test}$ (y=−1). That is, in the implementation 2, the function output values of the predictor weighting functions are normalized as the weighting of each predictor.

Figure 3:
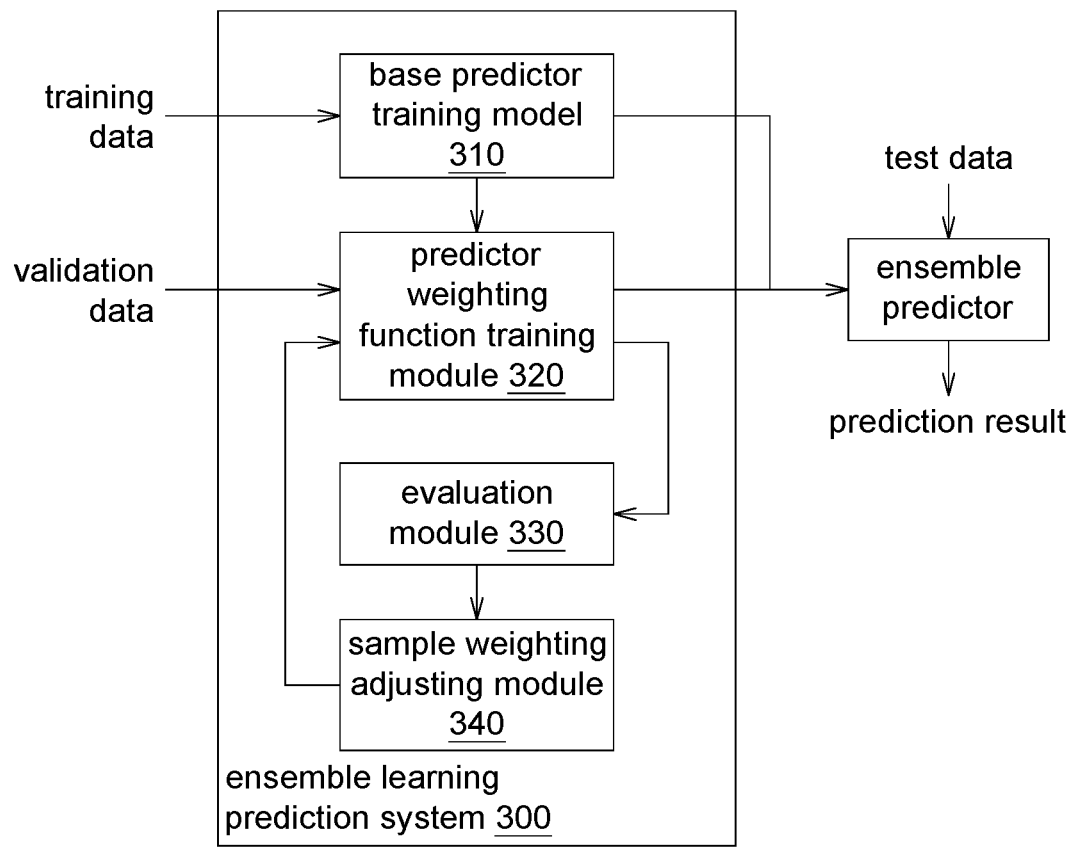
FIG. 3 shows a functional diagram of an ensemble learning predicting system according to one embodiment of the application.

FIG. 3 shows a functional block of an ensemble learning prediction system 300. The ensemble learning prediction system 300 includes: a base predictor training model 310, a predictor weighting function training module 320, an evaluation module 330 and a sample weighting adjusting module 340. The base predictor training model 310, the predictor weighting function training module 320, the evaluation module 330 and the sample weighting adjusting module 340 may implement the ensemble learning prediction method of the above embodiments of the application. The ensemble learning prediction system 300 may further include a display (not shown) to display the prediction results. The ensemble learning prediction system 300 may be an electronic device (for example but not limited by a server) having information processing functions. Further, The base predictor training model 310, the predictor weighting function training module 320, the evaluation module 330 and the sample weighting adjusting module 340 may be implemented by the hardware circuit (for example CPU) having information processing functions.

In the ensemble learning prediction of embodiments of the application, by considering the versatility and complementary of the predictors (or the prediction model), the weighting functions are established via sample weighting adjustment and sequence-optimized weighting function training mechanism. Thus, an embodiment of the application may effectively find the predictors which are suitable respective sample area to dynamically train the weighting functions and to improve the ensemble prediction effect. In here, "sequence-optimized weighting function training mechanism" means that it is to find respective target weighting function in each iteration round (i.e. to select the target weighting function $g_{(t)}$ in the t-th iteration round), rather than to select all target weighting functions in a single iteration round.

An embodiment of the application may cause specific effect on computers (via predicting the results by the respective target weighting function selected in each iteration round), i.e. the computers are not just means. Thus, an embodiment of the application is more than just to use computers. An embodiment of the application uses specific pattern rules to improve specific effects of the ensemble learning prediction system.

An embodiment of the application is directed to a specific field, for example but not limited by, a computer prediction system. The conventional computer prediction system is not able to effectively train the predictor weighting functions in complicated sample space. An embodiment of the application selects the target predictor and the target predictor weighting function in each iteration round based on the sequence-optimized weighting function evaluation module and steps, and therefore an embodiment of the application may effectively train the predictor weighting function even in complicated sample space (that is because an embodiment of the application selects the target predictor and the target predictor weighting function in each iteration round, rather than selecting all target predictors and all target predictor weighting functions in a single iteration round).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An ensemble learning prediction method for an electronic device, the method including:
    (a) establishing a plurality of base predictors based on a plurality of training data from a signal source, wherein the signal source comprises a sensor;
    (b) initializing a plurality of sample weights of a plurality of sample data and initializing a processing set, wherein the initialized processing set comprises a plurality of predictors corresponding to the plurality of base predictors, and a parameter t is set to be equal to 1, t is an integer, and t means an iteration round number;
    (c) in a t-th iteration round, based on the plurality of sample data and the plurality of sample weights, establishing a plurality of predictor weighting functions of the predictors in the processing set and performing prediction based on each of the plurality of sample data by each of the predictors in the processing set to generate a prediction result for each of the plurality of the sample data;
    (d) evaluating the plurality of predictor weighting functions, selecting a target predictor weighting function from the plurality of predictor weighting functions established in the t-th iteration round and selecting a target predictor corresponding to the target predictor weighting function from the plurality of predictors in the processing set based on an evaluation result, and updating the processing set and updating the plurality of sample weights of the plurality of sample data, wherein the predictor corresponding to the target predictor is removed from the updated processing set; and
    (e) adding the parameter t by 1 and repeating the steps (c), (d) and (e) based on the updated sample weights of the plurality of sample data to select another target predictor from the updated processing set and generate another target predictor weighting function until the parameter t is equal to a predetermined value corresponding to the number of base predictors,
    wherein a plurality of target predictor weighting functions and a plurality of target predictors corresponding to the number of base predictors are generated, the plurality of target predictor weighting functions and the plurality of target predictors are combined into an ensemble predictor, the ensemble predictor includes the plurality of target predictor weighting functions and the plurality of target predictors, and a prediction result of the ensemble predictor is shown in a display.

2. The method according to claim 1, wherein in step (b), the plurality of sample weights $k_j^{(t)}$ of the plurality of sample data $x_j$ are initialized, j=1~n, n meaning a number of the sample data;
    the initialized processing set H is expressed as H={$h_1$, $h_2$, . . . , $h_N$}, $h_1$, $h_2$, . . . , $h_N$ mean the predictors corresponding to the plurality of base predictors.

3. The method according to claim 2, wherein the step (c) includes:
    in each of the iteration rounds, evaluating respective score of each of the predictor weighting functions, the score of a corresponding predictor weighting function representing whether a corresponding prediction result of a corresponding predictor is consistent with an output value of the corresponding predictor weighting function;
    the predictor weighting function having the highest score among the plurality of the predictor weighting functions is selected as the target predictor weighting function in the t-th iteration round, $h_{(t)}=h_i$ and $g_{(t)}=f_i^{(t)}$, $h_{(t)}$ and $g_{(t)}$ are the target predictor and the target predictor weighting function selected in the t-th iteration round.

4. The method according to claim 3, wherein in updating the sample weight of the sample data $x_j$ in step (d):
    when in the t-th iteration round, the sample data $x_1$ is correctly predicted by the target predictor $h_{(t)}$ and the predictor weighting function $g_{(t)}$ of the target predictor $h_{(t)}$ has a high output value, the sample weight of the sample data $x_j$ is decreased;
    when in the t-th iteration round, the sample data $x_j$ is correctly predicted by the target predictor $h_{(t)}$ and the predictor weighting function $g_{(t)}$ of the target predictor $h_{(t)}$ has a low output value, the sample weight of the sample data $x_j$ is decreased;
    when in the t-th iteration round, the sample data $x_j$ is not correctly predicted by the target predictor $h_{(t)}$ and the predictor weighting function $g_{(t)}$ of the target predictor $h_{(t)}$ has a high output value, the sample weight of the sample data $x_j$ is increased; and
    when in the t-th iteration round, the sample data $x_j$ is not correctly predicted by the target predictor $h_{(t)}$ and the predictor weighting function $g_{(t)}$ of the target predictor $h_{(t)}$ has a low output value, the sample weight of the sample data $x_j$ is increased.

5. The method according to claim 1, wherein as for the ensemble predictor, respective function output values of the target predictor weighting functions are calculated, a first one among the target predictor weighting functions having a function output value higher than a threshold is assigned by a highest weighting and the other target predictor weighting functions are assigned by zero weighting.

6. The method according to claim 1, wherein as for the ensemble predictor, respective function output values of the target predictor weighting functions are normalized as respective weights of the target predictors.

7. An ensemble learning prediction system including:
a base predictor training model, for performing operation (a), wherein in operation (a), a plurality of base predictors are established based on a plurality of training data from a signal source, and the signal source comprises a sensor;
a predictor weighting function training module, for performing operations (b) and (c), wherein in operation (b), a plurality of sample weights of a plurality of sample data are initialized and a processing set is initialized, the initialized processing set comprises a plurality of predictors corresponding to the plurality of base predictors, and a parameter t is set to be equal to 1, t is an integer, and t means an iteration round number, in operation (c), in a t-th iteration round, based on the plurality of sample data and the plurality of sample weights, a plurality of predictor weighting functions of the predictors in the processing set are established and prediction is performed based on each of the plurality of sample data by each of the predictors in the processing set to generate a prediction result for each of the plurality of the sample data;
an evaluation module, for performing operation (d), wherein in operation (d), the plurality of predictor weighting functions are evaluated, and a target predictor weighting function is selected from the plurality of predictor weighting functions established in the t-th iteration round and a target predictor corresponding to the target predictor weighting function is selected from the plurality of predictors in the processing set based on an evaluation result; and
a sample weight adjustment module, for performing operation (e), wherein in operation (e), the processing set is updated and the plurality of sample weights of the plurality of sample data are updated, and the predictor corresponding to the target predictor is removed from the updated processing set;
wherein an operation (f) is performed by the ensemble learning prediction system, in operation (f), the parameter t is added by 1 and the operations (c), (d), (e), and (f) are repeated based on the updated sample weights of the plurality of sample data to select another target predictor from the updated processing set and generate another target predictor weighting function a until the parameter t is equal to a predetermined value corresponding to the number of base predictors;
wherein a plurality of target predictor weighting functions and a plurality of target predictors corresponding to the number of base predictors are generated, the plurality of target predictor weighting functions and the plurality of target predictors are combined into an ensemble predictor, the ensemble predictor includes the plurality of target predictor weighting functions and the plurality of target predictors, and a prediction result of the ensemble predictor is shown in a display;
wherein the base predictor training model, the predictor weighting function training module, the evaluation module, and the sample weight adjustment module are implemented by a hardware circuit.

8. The system according to claim 7, wherein in operation (b),
the predictor weighting function training module initializes the plurality of sample weights $k_j^{(t)}$ of the plurality of sample data $x_j$, j=1~n, n meaning a number of the sample data;
the initialized processing set H is expressed as H={$h_1$, $h_2$, . . . , $h_N$}, $h_1$, $h_2$, . . . , $h_N$ mean the predictors corresponding to the plurality of base predictors.

9. The system according to claim 8, wherein in operation (c), the evaluation module is configured for:
in each of the iteration rounds, evaluating respective score of each of the predictor weighting functions, the score of a corresponding predictor weighting function representing whether a corresponding prediction result of a corresponding predictor is consistent with an output value of the corresponding predictor weighting function;
selecting the predictor weighting function having the highest score among the plurality of the predictor weighting functions as the target predictor weighting function in the t-th iteration round, $h_{(t)}=h_i$ and $g_{(t)}=f_i^{(t)}$, $h_{(t)}$ and $g_{(t)}$ are the target predictor and the target predictor weighting function selected in the t-th iteration round.

10. The system according to claim 7, wherein in updating the sample weight of the sample data $x_j$ in operation (e), the sample weight adjustment module is configured for:
when in the t-th iteration round, the sample data $x_j$ is correctly predicted by the target predictor $h_{(t)}$ and the predictor weighting function $g_{(t)}$ of the target predictor $h_{(t)}$ has a high output value, decreasing the sample weight of the sample data $x_j$;
when in the t-th iteration round, the sample data $x_j$ is correctly predicted by the target predictor $h_{(t)}$ and the predictor weighting function $g_{(t)}$ of the target predictor $h_{(t)}$ has a low output value, decreasing the sample weight of 7 data $x_j$;
when in the t-th iteration round, the sample data $x_j$ is not correctly predicted by the target predictor $h_{(t)}$ and the predictor weighting function $g_{(t)}$ of the target predictor $h_{(t)}$ has a high output value, increasing the sample weight of the sample data $x_j$; and
when in the t-th iteration round, the sample data $x_j$ is not correctly predicted by the target predictor $h_{(t)}$ and the predictor weighting function $g_{(t)}$ of the target predictor $h_{(t)}$ has a low output value, increasing the sample weight of the sample data $x_j$.

11. The system according to claim 7, wherein as for the ensemble predictor, respective function output values of the target predictor weighting functions are calculated, a first one among the target predictor weighting functions having a function output value higher than a threshold is assigned by a highest weighting and the other target predictor weighting functions are assigned by zero weighting.

12. The system according to claim 7, wherein as for the ensemble predictor, respective function output values of the target predictor weighting functions are normalized as respective weights of the target predictors.

* * * * *